Dec. 2, 1958 R. DAUB 2,862,774
PISTON STRUCTURE
Original Filed May 29, 1952
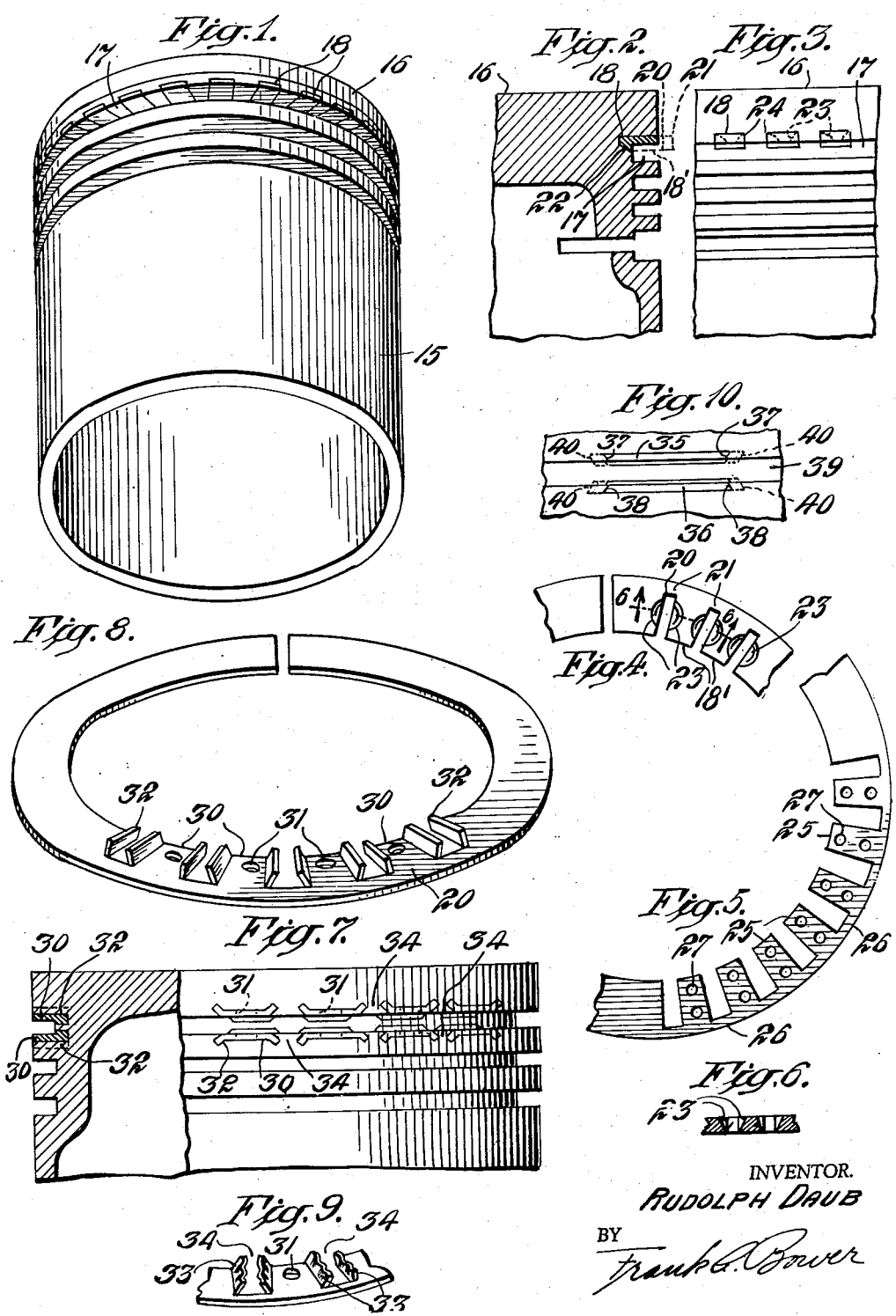
INVENTOR.
RUDOLPH DAUB
BY

United States Patent Office 2,862,774
Patented Dec. 2, 1958

2,862,774

PISTON STRUCTURE

Rudolph Daub, West Caldwell, N. J., assignor of twenty percent to Frank A. Bower, New York, N. Y.

Original application May 29, 1952, Serial No. 290,738, now Patent No. 2,755,151, dated July 17, 1956. Divided and this application July 12, 1956, Serial No. 597,405

The portion of the term of the patent subsequent to July 17, 1973, has been disclaimed

4 Claims. (Cl. 309—14)

This invention relates to piston structures and particularly to pistons of internal combustion engines.

The object of the invention is to provide a piston structure simple and inexpensive in manufacture and having surfaces of the piston grooves reinforced by hard metal wear plates distributed flatwise around the piston in a plane normal to the piston axis and anchored in place in the metal of the piston.

Further objects of the invention particularly in the formation of the plates to provide specially shaped parts for secure anchorage in the lighter metal of the piston will appear in the following specification taken in connection with the accompanying drawing in which:

Fig. 1 is a perspective view of a piston structure having a wall of a groove provided with wear plates in accordance with this invention;

Fig. 2 is a partial radial section on enlarged scale of the piston structure of Fig. 1 illustrating the reinforcement and the method of formation thereof;

Fig. 3 is a partial elevational view of the piston shown in Figs. 1 and 2;

Fig. 4 is a partial plan view of a portion of a ring illustrating a modified formation of reinforcing plates for casting in the piston structure of Figs. 1, 2 and 3;

Fig. 5 is a partial plan view of a further modification of a ring illustrating the formation of reinforcing plates in accordance with this invention;

Fig. 6 is a partial sectional view of a ring taken on line 6—6 of Fig. 4;

Fig. 7 is a partial elevational view of another piston structure of this invention partly in section;

Fig. 8 is a perspective view of a ring with wear plates for the structure of Fig. 6, the partial showing of the wear plates being illustrative of the formation which extends around the entire ring;

Fig. 9 is a partial perspective view of a modified plate ring of the type illustrated in Figs. 7 and 8;

Fig. 10 illustrates another embodiment of metal expanding in width in an inward direction and having sloped edges.

In the embodiment of the invention shown in Figs. 1 to 3 the piston 15 has head 16 and head groove 17 provided at its upper face with wear plates 18 cast in place in the metal of the piston.

These plates 18 are separate in the final piston structure shown and their spacing in even sequence around the groove 17 is attained by forming them as a continuous sequence of plates in an integral strip having a radial section outlined at 20 in dot and dash lining in Fig. 2. A straight strip has a continuous edge portion 21 with plates 18' projecting from it on one side in evenly spaced sequence and with their ends beveled as indicated at 22. The strip 20 is then bent into circular form (similar to Fig. 4) corresponding to the diameter shown in Fig. 2 and is supported in place in the mold so as to have the aluminum alloy metal of piston 15 cast around the plates 18', the edge strip 21 connecting plates 18' being preferably around the outside of the piston periphery as indicated in Fig. 2. Then, upon machining of the piston grooves, the ring or rim 21 is cut away and the plates 18' are cut on the outer edge and under surfaces to correspond to the grooving as shown in full line sectioning in Fig. 2.

Preferably the plates 18' will have recesses for better securing them in place in the alloy. For instance, as illustrated in Fig. 5, conical cut-outs 23 are made at the under surfaces of opposite edges of the plates and in the casting operation metal will flow into these recesses 23 so as to form underlying lips 24 of alloy on each side (Fig. 3).

These plates 18 are thus independent of each other imbedded in the alloy of the piston and preferably provided with interlocking protrusions of the alloy such as lips 24 securing them against release. The piston ring of groove 17 bears against the plates 18 and the groove surfaces between them, and these groove surfaces, due to expansion at higher temperatures, tend to bulge slightly between the plates and are correspondingly worked against the hard upper surface of the piston ring and skin-toughened in very desirable manner. Thus, the lips 24 under the plate edges will be strengthened and pressed into close contact with the recesses 23 and at the same time are strengthened and hardened.

Similarly, where, as indicated in Fig. 5, the plates 25 joined by rim 26 of the initial strip have recesses in the form of holes or orifices 27, these are filled with the alloy during casting and the metal protruding into the holes provides a composite surfacing of the plates in the groove with skin hardening and toughening of the alloy surfaces under the hammering of the hard piston ring.

As illustrated in Fig. 8, the plates 30 in addition to holes 31 may have plain flanges 32 or ruffled flanges 33 (Fig. 9) diverging outward at any angle forming the alloy intrusions in the final piston into dovetails 34 between the plates and underlying the flanges and presenting flat surfaces to the hammering hardening action of the piston ring.

In Fig. 10 the hard metal inserts or pieces 35, 36 are illustrated with their edges 37, 38 cut at angles spreading to greater width within the seat in the metal on each side of the groove 39 so that they are retained against axial movement. Similarly these inserts are slightly tapered to less width at their outer ends from an intermediate point 40 so as to be retained against radial outward movement.

The system of this invention provides a very simple, adaptable, and effective reinforcement applicable to one or more of the piston groove surfaces with no substantial increase in cost and adding greatly to the life of the piston and with improvement in the sealing action in the cylinder.

This case is a division of my co-pending application, Serial No. 290,738 filed May 29, 1952, now Patent No. 2,755,151, issued July 17, 1956, which is a continuation in part of my application, Serial No. 225,533, filed May 10, 1951, now Patent No. 2,685,729.

I claim:

1. A piston structure comprising a generally cylindrical piston head, a piston ring groove in said head and a series of reinforcing groove-facing units of plate metal pieces independently cast in the metal of said piston as facings of groove surfaces and seated in recesses therein having unit supporting surfaces in planes normal to the axis of the piston, each unit having generally radially extending side edges with generally radially extending surfaces interlocking axially with the metal of the piston and acting to retain it against axial dislodgement or loosening in service, and radial locking means formed by a cut out portion recessed at the side edge of said metal piece and cooperating with a projection of the piston metal formed as a single piece at said piston head and having the shape of said cut out to tightly lock said metal piece against radial dislodgement.

2. A piston structure as set forth in claim 1 wherein said cut out portion extends through only a portion of the thickness of said metal piece.

3. A piston structure as set forth in claim 1 wherein said cut out portion forms the axially interlocking means by having a surface facing said piston ring groove and said projection is positioned between said surface and said piston ring groove to form a surface adjacent to said metal piece as a portion of the wall of the piston ring groove to receive the hammering of the piston ring to maintain said projection in tight locking contact with said cut out to prevent relative axial movement of said metal piece and of said piston head.

4. A piston structure as set forth in claim 1 wherein said radial locking means formed by radial edges on said metal piece diverging inwardly so that the width of said metal piece is greater at the inner end than at the outer end and said piston head cast to form a wedged shaped portion engaging said edges to lock said metal piece in said piston head.

References Cited in the file of this patent

UNITED STATES PATENTS

| | | |
|---|---|---|
| 2,685,729 | Daub | Aug. 10, 1954 |
| 2,689,773 | Brenneke | Sept. 21, 1954 |
| 2,755,151 | Daub | July 17, 1956 |
| 2,771,328 | Wainwright et al. | Nov. 20, 1956 |